US010725655B2

(12) United States Patent
Takano et al.

(10) Patent No.: US 10,725,655 B2
(45) Date of Patent: Jul. 28, 2020

(54) OPERATION APPARATUS

(71) Applicant: ALPINE ELECTRONICS, INC., Ota-ku, Tokyo (JP)

(72) Inventors: Yasushige Takano, Iwaki (JP); Michiaki Otani, Iwaki (JP)

(73) Assignee: ALPINE ELECTRONICS, INC., Tokyo (JP)

(*) Notice: Subject to any disclaimer, the term of this patent is extended or adjusted under 35 U.S.C. 154(b) by 0 days.

(21) Appl. No.: 16/505,039

(22) Filed: Jul. 8, 2019

(65) Prior Publication Data
US 2020/0081616 A1  Mar. 12, 2020

(30) Foreign Application Priority Data
Sep. 12, 2018  (JP) .................... 2018-170182

(51) Int. Cl.
*G06F 3/041* (2006.01)
*G06F 3/0488* (2013.01)
*G06F 3/0484* (2013.01)
*B60K 35/00* (2006.01)
*G06F 3/0482* (2013.01)

(52) U.S. Cl.
CPC .......... *G06F 3/04883* (2013.01); *B60K 35/00* (2013.01); *G06F 3/0482* (2013.01); *G06F 3/04847* (2013.01); *B60K 2370/1438* (2019.05)

(58) Field of Classification Search
CPC ............ B60K 2370/1438; B60K 35/00; G06F 3/0482; G06F 3/04847; G06F 3/04883
See application file for complete search history.

(56) References Cited

U.S. PATENT DOCUMENTS

| 2011/0050609 A1 | 3/2011 | Fluhrer |
| 2016/0162092 A1 | 6/2016 | Kukimoto et al. |
| 2017/0245340 A1 | 8/2017 | Chen et al. |
| 2017/0364164 A1* | 12/2017 | Kim ..................... G06F 3/04883 |
| 2018/0043923 A1* | 2/2018 | Yamada ............... B62D 15/026 |

FOREIGN PATENT DOCUMENTS

JP  2011-048823  3/2011

OTHER PUBLICATIONS

Extended European Search Report for 19196133.3 dated Jan. 27, 2020, 7 pgs.

* cited by examiner

*Primary Examiner* — Insa Sadio
(74) *Attorney, Agent, or Firm* — Brinks Gilson & Lione

(57) ABSTRACT

An operation apparatus detects a finger using a sensor disposed on an operation plane and further determines a movement distance of the finger so as to change an operation of a controlled device, such as an in-vehicle air conditioner. A finger touching or approaching the operation plane is detected by an electrostatic sensor. An air volume of the air conditioner which is the controlled device is changed by a movement of the detected finger in an X1 or X2 direction. When the finger is moved by a first distance from a first detected position, the air volume is changed in a predetermined range. Thereafter, every time the finger is moved by a second distance which is different than the first distance, the air volume is changed in a range equivalent to a range in the case of the movement by the first distance.

19 Claims, 13 Drawing Sheets $V0 < V1 < V2 < V3$
$Lw1 > Lw2 > Lw3$

… (1)

OPERATION APPARATUS

RELATED APPLICATION

The present application claims priority to Japanese Patent Application Number 2018-170182, filed Sep. 12, 2018, the entirety of which is hereby incorporated by reference.

BACKGROUND OF THE INVENTION

1. Field of the Invention

The present invention relates to an operation apparatus which includes a sensor for detecting a finger or a hand touching or approaching an operation plane and which may change an operation state of a controlled device in a continuous manner or in stages by a movement of the detected finger or the detected hand.

2. Description of the Related Art

Japanese Unexamined Patent Application Publication No. 2011-48823 discloses an invention relating to an operation apparatus. The operation apparatus includes a sensor operation panel to be operated by a finger and a display device which displays a two-digit number.

When a finger touches a start point displayed on the sensor operation panel and is moved right in a first direction, a number in the ones place displayed on the display device may be successively increased. Furthermore, when the finger is moved upward from the start point in a second direction which is orthogonal to the first direction, a number in the tens digit place displayed on the display device may be successively increased. In this way, by changing the two-digit number, a power stage of a fan may be changed or a luminance setting of a lighting system may be performed.

Furthermore, in the sensor operation panel, a sector boundary is set at an angle of 45 degrees at maximum relative to the first direction with reference to the start point, and an operation may be normally performed even when the finger is obliquely moved relative to the first direction only if the movement is within a range of the angle of the sector boundary. The sector boundary may be similarly set relative to the second direction.

In general, in such a type of operation apparatus, every time the finger touching the start point of the sensor operation panel is moved in the first direction or the second direction by a certain distance, an operation of a controlled device is changed by the same range. In the example of Japanese Unexamined Patent Application Publication No. 2011-48823, every time the finger is moved by a certain distance, a number in the display is incremented by one starting from 1.

If a movement distance set for changing an operation of the controlled device in a certain range is too long in such an operation apparatus, a user may feel that a change of the operation of the controlled device is slow when the finger touching the sensor operation panel is moved for the first time. In the example of Japanese Unexamined Patent Application Publication No. 2011-48823, when the finger touching the start point is moved in the first direction or the second direction, incrementing of the number displayed in the display is slow, and therefore, a user may feel anxious about whether the operation has been normally performed.

On the other hand, if a movement distance of a finger set for changing an operation of the controlled device in a certain range is too short, the operation of the controlled device is quickly changed when the finger touching the sensor operation panel for the first time is slightly moved. In the example of Japanese Unexamined Patent Application Publication No. 2011-48823, a phenomenon occurs in which the number displayed in the display device is accidentally increased in two stages or three stages only by slightly moving the finger touching the start point in the first direction or the second direction.

In in-vehicle operation apparatuses, an operation plane is operated by a hand during driving while the operation plane is not viewed. Therefore, if a movement distance of a finger set for changing an operation of a controlled device is too long or too short, the user feels anxious about an operation performed immediately after a finger is detected on the operation plane, and consequently, an erroneous operation may be performed.

SUMMARY

The present disclosure is made in view of the problems described above, and is to provide an operation apparatus capable of changing an operation of a controlled device without an uneasy feeling by a movement of a finger or a hand touching or approaching the operation plane.

Furthermore, the present disclosure is to provide an operation apparatus capable of changing an operation of a controlled device in accordance with an intention of an operation by performing a subsequent operation after an operation state of a finger or a hand touching or approaching the operation plane is reflected.

According to an aspect of the present disclosure, an operation apparatus includes an operation plane, a sensor configured to detect a finger or a hand touching or approaching the operation plane and further detect a movement of the finger or the hand touching or approaching the operation plane, and a controller configured to control a controlled device based on a detection output of the sensor. The controller determines start of an operation when the sensor detects a finger or a hand touching or approaching the operation plane, changes the operation of the controlled device in a prescribed range when it is determined that the finger or the hand detected by the sensor has been moved by a first distance along the operation plane at a time point after the determination of the start of the operation, and changes the operation of the controlled device in a range equivalent to the prescribed range when it is determined that the finger or the hand moved by the first distance has been moved by a distance which is different from the first distance along the operation plane.

The controller may successively change the operation of the controlled device in a range equivalent to the prescribed range every time it is determined that the finger or the hand moved by the first distance has been moved by a second distance which is longer than the first distance along the operation plane.

The controller may successively change the operation of the controlled device in a range equivalent to the prescribed range every time it is determined that the finger or the hand moved by the first distance has been moved by a distance which is longer than the first distance and which is increased in stages along the operation plane.

The controller may successively change the operation of the controlled device in a range equivalent to the prescribed range every time it is determined that the finger or the hand moved by the first distance has been moved by a second distance which is shorter than the first distance along the operation plane.

The controller may successively change the operation of the controlled device in a range equivalent to the prescribed range every time it is determined that the finger or the hand moved by the first distance has been moved by a distance which is shorter than the first distance and which is reduced in stages along the operation plane.

The controller may measure a speed or an acceleration rate while the finger or the hand is moved by the first distance along the operation plane based on the detection output of the sensor and set a movement distance of the finger or the hand required for a change of the operation of the controlled device in a range equivalent to the prescribed range in accordance with the measured speed or the measured acceleration rate.

The controller may set a long movement distance of the finger or the hand required for a change of the operation of the controlled device in a range equivalent to the prescribed range when the measured speed or the measured acceleration rate is smaller than a reference value and set a short movement distance of the finger or the hand required for a change of the operation of the controlled device in a range equivalent to the prescribed range when the measured speed or the measured acceleration rate is larger than the reference value.

The first distance may be set using a position of the finger or the hand obtained when the start of the operation is determined as a start point.

The first distance may be set using a position of the finger or the hand which has been moved by a predetermined distance after the start of the operation is determined as a start point.

The controller may change the operation of the controlled device in one of different control modes in accordance with a movement direction of the finger or the hand when it is determined that the finger or the hand has been moved in one of different directions which are orthogonal to each other along the operation plane.

The controller may perform a feedback operation by force or sound when it is determined that the finger or the hand has been moved by the first distance and further perform a feedback operation by force or sound every time it is determined that the finger or the hand has been moved by a distance required for a change of the operation of the controlled device in a range equivalent to the prescribed range.

According to an aspect of the present disclosure, an operation control method for an operation apparatus including an operation plane, a sensor configured to detect a finger or a hand touching or approaching the operation plane and further detect a movement of the finger or the hand touching or approaching the operation plane, and a controller configured to control a controlled device based on a detection output of the sensor, includes a first step of determining start of an operation when the sensor detects a finger or a hand touching or approaching the operation plane, a second step of changing the operation of the controlled device in a prescribed range when it is determined that the finger or the hand detected by the sensor has been moved by a first distance along the operation plane at a time point after the determination of the start of the operation, and a third step of changing the operation of the controlled device in a range equivalent to the prescribed range when it is determined that the finger or the hand moved by the first distance has been moved by a distance which is different from the first distance along the operation plane.

The operation of the controlled device may be successively changed in a range equivalent to the prescribed range every time it is determined that the finger or the hand moved by the first distance has been moved by a second distance which is longer than the first distance along the operation plane in the third step.

The operation of the controlled device may be successively changed in a range equivalent to the prescribed range every time it is determined that the finger or the hand moved by the first distance has been moved by a distance which is longer than the first distance and which is increased in stages along the operation plane in the third step.

The operation of the controlled device may be successively changed in a range equivalent to the prescribed range every time it is determined that the finger or the hand moved by the first distance has been moved by a second distance which is shorter than the first distance along the operation plane in the third step.

The operation of the controlled device may be successively changed in a range equivalent to the prescribed range every time it is determined that the finger or the hand moved by the first distance has been moved by a distance which is shorter than the first distance and which is reduced in stages along the operation plane in the third step.

A speed or an acceleration rate may be measured while the finger or the hand is moved by the first distance along the operation plane based on a detection output of the sensor in the second step. A movement distance of the finger or the hand required for a change of the operation of the controlled device in a range equivalent to the prescribed range in the third step may be set in accordance with the measured speed or the measured acceleration rate in the third step.

A long movement distance of the finger or the hand required for a change of the operation of the controlled device in a range equivalent to the prescribed range may be set in the third step when the measured speed or the measured acceleration rate is smaller than a reference value in the second step and a short movement distance of the finger or the hand required for a change of the operation of the controlled device in a range equivalent to the prescribed range may be set in the third step when the measured speed or the measured acceleration rate is larger than the reference value in the second step.

The operation of the controlled device may be changed in one of different control modes in accordance with a movement direction of the finger or the hand when it is determined that the finger or the hand has been moved in one of different directions which are orthogonal to each other along the operation plane in the second and third steps.

According to the operation apparatus of the present disclosure, an operation of a controlled device may be changed in a predetermined prescribed range in stages or in a continuous manner when a finger or a hand touching or approaching the operation plane is moved by a first distance. However, thereafter, a movement distance of the finger or the hand for changing the operation of the controlled device in a range which is equivalent to the prescribed range is changed in accordance with an operation state of the finger or the hand or an intention of an operator. Therefore, even an operation in a state in which a vehicle body is vibrated or an operation without viewing the operation plane, for example, may be normally performed as much as possible and occurrence of an erroneous operation may be suppressed.

For example, if the first distance is set shorter than a distance for a subsequent change, an operation of the controlled device may be changed in a prescribed range only by moving a finger or a hand detected on the operation plane by the short distance, and accordingly, a fact that an appropriate operation has been performed may be immediately recognized. In particular, if a feedback operation is performed when a finger or a hand is moved by the first distance, a change of the controlled device which is normally performed by moving the finger or the hand by the short distance may be immediately recognized. After this operation, the operation of the controlled device is changed every time the finger or the hand is moved by a slightly longer distance, and therefore, after the movement by the first distance, fine control of the controlled device may be easily performed by a movement of the finger, for example.

On the other hand, if the first distance is set longer than a distance for a subsequent change, an operation of the controlled device is prevented from being accidentally changed in stages by a movement of a finger or a hand immediately after start of the operation. After the movement by the first distance, the operation of the controlled device may be changed in the prescribed range only by moving the finger or the hand by a short distance, and therefore, a subsequent change operation may be quickly performed.

Furthermore, when a speed or an acceleration rate in the movement of the hand or the finger by the first distance is measured and a movement distance for changing the operation of the controlled device in a range which is equivalent to the prescribed range is set in accordance with the speed or the acceleration rate, an operation in which an intention of the operator is reflected may be performed.

DESCRIPTION OF THE PREFERRED EMBODIMENTS

Figure 1:
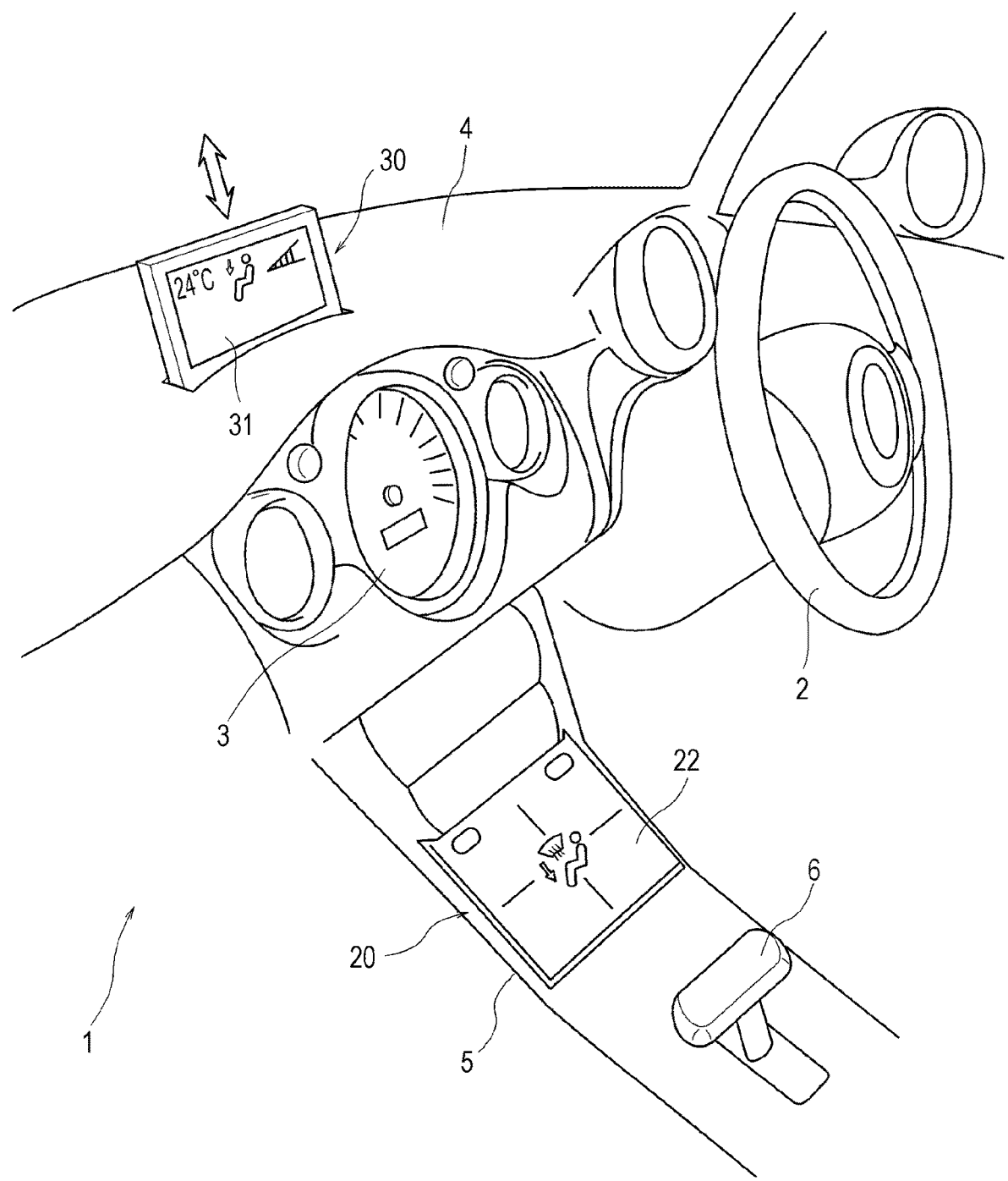
FIG. 1 is a perspective view of a structure of a vehicle interior of a vehicle where an in-vehicle operation apparatus is installed according to an embodiment of the present invention.

FIG. 1 is a perspective view of a structure of a vehicle interior of a vehicle including an in-vehicle operation apparatus 10 installed therein according to an embodiment of the present invention.

The vehicle interior of a vehicle 1 includes a steering wheel 2 in front of a driving seat, an instrument panel 3 in front of the steering wheel 2, and a dashboard 4 on an upper portion relative to the steering wheel 2. An arm rest 5 is disposed on one side of the driving seat, and a gearshift 6 is disposed on the arm rest 5. The vehicle 1 illustrated in FIG. 1 may have or may not have an automatic driving function.

Figure 17:
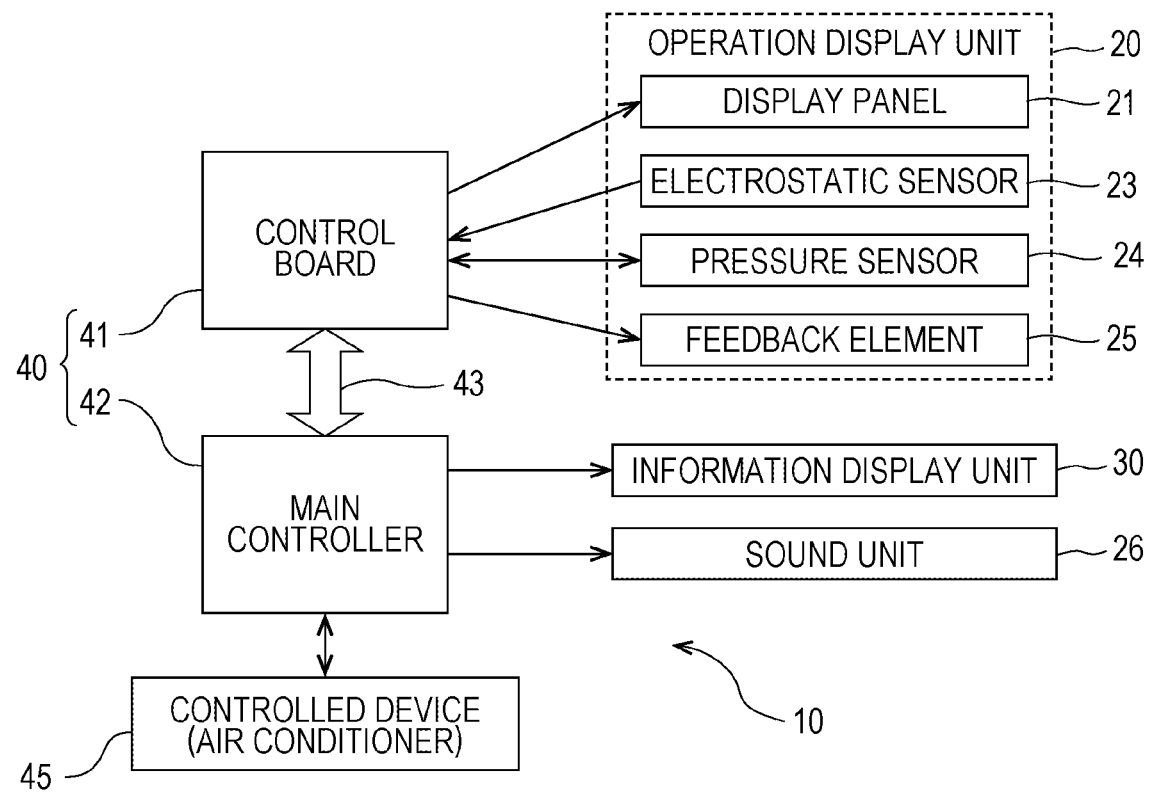
FIG. 17 is a block diagram illustrating a structure of the in-vehicle display device according to the embodiment of the present invention.

As illustrated in FIG. 17, the in-vehicle operation apparatus 10 of this embodiment of the present invention includes an operation display unit 20 and an information display unit 30. As illustrated in FIG. 1, the operation display unit 20 is disposed on the arm rest 5, and the information display unit 30 is disposed on the dashboard 4. The information display unit 30 has an accommodation state in which the information display unit 30 is accommodated in the dashboard 4, a first display state in which the information display unit 30 partially projects upward from the dashboard 4, and a second display state in which the information display unit 30 totally projects upward from the dashboard 4, and may be switched from one state to another.

As illustrated in FIG. 17, the operation display unit 20 has a display panel 21, such as a liquid crystal display panel or an electroluminescence display panel. A transparent panel is disposed on a surface of the operation display unit 20 illustrated in FIG. 1, and a portion of the panel functions as an operation plane (operation display plane) 22. An image generated in the display panel 21 is displayed in the operation plane 22. Furthermore, an electrostatic sensor 23 disposed on an inner surface of the operation plane 22 may detect a touch or approach of a finger or a hand to the operation plane 22 and further detect a movement of the detected finger or the detected hand along the operation plane 22.

As illustrated in FIG. 17, a pressure sensor 24 is included in the operation display unit 20. The pressure sensor 24 is a piezoelectric element or a force sensor element which is disposed on a back portion of the panel of the operation plane 22 and may detect a press on the panel included in the operation plane 22 by the finger or the hand.

As illustrated in FIG. 17, a feedback element 25 is disposed inside of the panel included in the operation plane 22. The feedback element 25 has an electromagnetic solenoid mechanism or a motor mechanism which rotates a weight having an eccentric center of gravity. When the feedback element 25 is operated, a feedback force is applied to the finger or the hand touching the operation plane 22. As illustrated in FIG. 17, the in-vehicle operation apparatus 10 further includes a sound unit 26. The sound unit 26 is a speaker installed in the vehicle interior. When a so-called hovering operation of detecting a movement of a finger or a hand by the electrostatic sensor 23 in a state in which the finger or the hand is separated from the operation plane 22 is performed, feedback of an operation state is supplied to an operator by generating a sound in the sound unit 26.

Figure 3:
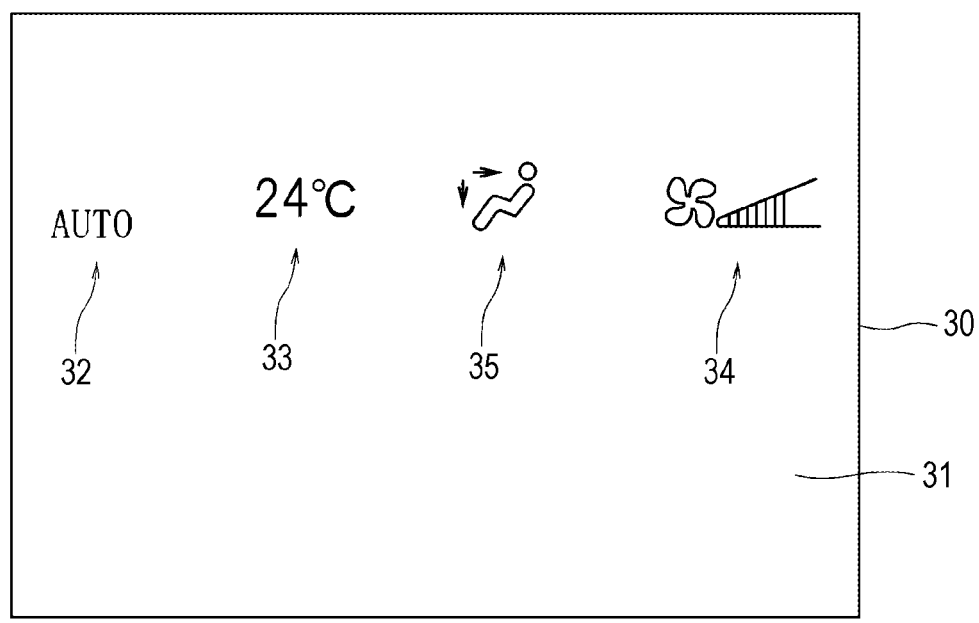
FIG. 3 is a front view of an information display screen of an information display unit disposed in the in-vehicle operation apparatus of FIG. 1.
Figure 5:
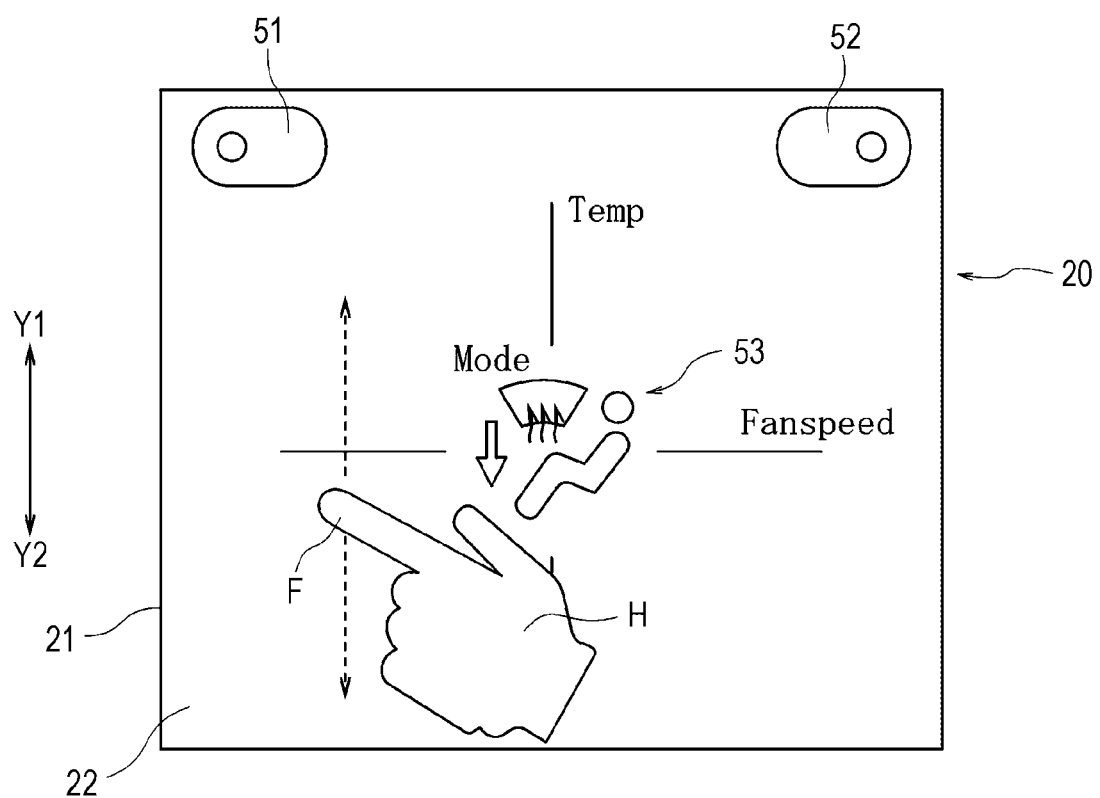
FIG. 5 is a diagram illustrating an operation in a second direction on the operation plane.

As illustrated in FIG. 1, the information display unit 30 also has a display panel. Examples of the display panel include a liquid crystal display panel and an electroluminescence display panel. The information display unit 30 includes a transparent panel on a surface facing the vehicle interior. A portion of the panel serves as an information display screen 31 which displays information images generated by the display panel. As illustrated in FIG. 3, an automatic mode switching image 32, a temperature display image 33, an air volume display image 34, and an air outlet switching image 35 are displayed in the information display screen 31. As illustrated in FIG. 5, a temperature synchronization setting is performed in the driver's seat and a passenger seat by operating a button display 52 displayed in the operation plane 22 of the operation display unit 20, and a changing state of the synchronization setting is also displayed in the information display screen 31. Note that various information may be displayed in a head up display (HUD) positioned in front of the driver's seat instead of the information display unit 30.

As illustrated in FIG. 17, a control board 41 is disposed in the operation display unit 20. The control board 41 includes a central processing unit (CPU), a memory, and an input/output (I/O) port. The control board 41 controls image display on the display panel 21 and also receives and processes detection outputs of the electrostatic sensor 23 and the pressure sensor 24. The control board 41 further controls driving of the feedback element 25. As illustrated in FIG. 17, the in-vehicle operation apparatus 10 includes a main controller 42. The main controller 42 mainly includes a CPU and further includes a memory and an I/O port. The main controller 42 and the control board 41 are connected through a BUS 43, and transmission and reception of various information are performed between the main controller 42 and the control board 41. A "controller 40" is configured by the main controller 42 and the control board 41. Operations of the information display unit 30 and the sound unit 26 are individually controlled by the main controller 42.

As illustrated in FIG. 17, the main controller 42 changes an operation of a controlled device 45 installed in in the vehicle interior. In this embodiment, the controlled device 45 is an air conditioner, and an air volume and a temperature setting of the air conditioner are changed by operating the operation display unit 20, and an air outlet is further changed by operating the operation display unit 20. Note that the controlled device 45 may be a sound device or a car navigation device, or may be a control device associated with a driving function of a vehicle, and an operation of such a controlled device 45 may be changed by operating the operation display unit 20.

Figure 2:
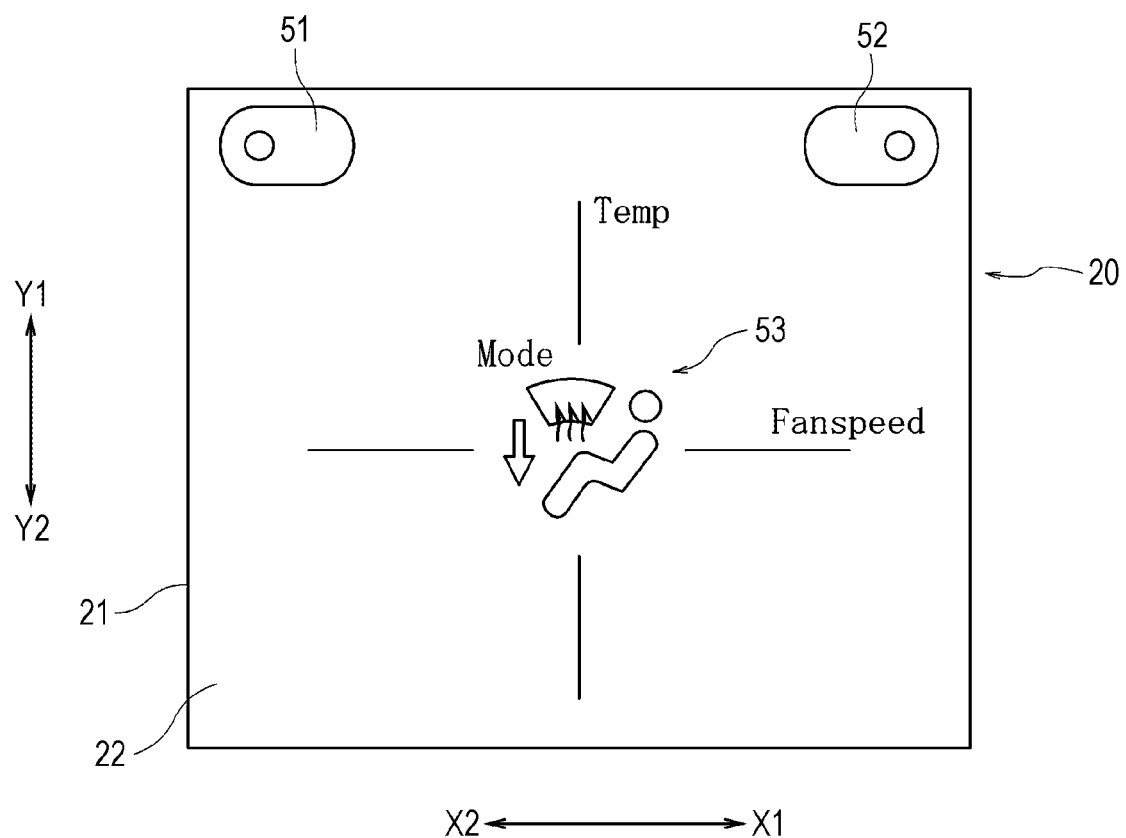
FIG. 2 is a front view of an operation plane of an operation display unit disposed in the in-vehicle operation apparatus of FIG. 1.

FIG. 2 is a diagram illustrating the operation plane (the operation display plane) 22 of the operation display unit 20. The operation plane 22 is disposed obliquely upward on a surface of the arm rest 5 in the vehicle interior in a state in which the operation plane 22 faces both of a ceiling and an inside of the vehicle interior. The operation display unit 20 may operate a plurality of controlled devices 45 installed in the vehicle 1. In this case, when one of the controlled devices 45 is selected, a corresponding one of different control images for the selected one of the different controlled devices 45 is displayed on the operation plane 22. In this embodiment, an air conditioner is selected as the controlled device 45, and a control image for controlling the air conditioner is displayed in the operation plane 22.

In the control image displayed in the operation plane 22 illustrated in FIG. 2, button displays 51 and 52 may be displayed as the only two portions, which is the minimum number. Furthermore, the button displays 51 and 52 are separately positioned at opposite ends in a lateral direction (a direction of X1 to X2) in an upper portion (a Y1 direction) of the operation plane 22. When the electrostatic sensor 23 detects a finger touching the button display 51 or the button display 52 or when the electrostatic sensor 23 detects a finger approaching the button display 51 or the button display 52 within a predetermined distance, the controller 40 determines that the button display 51 or the button display 52 has been operated.

In a display mode of this embodiment, the button display 51 is used to set an automatic mode of the air conditioner. When a finger touching or approaching the button display 51 is detected, a setting of the automatic mode or cancel of the setting of the automatic mode is performed in a switching manner by a control operation performed by the controller 40. In this case, a display state of the automatic mode switching image 32 displayed in the information display screen 31 illustrated in FIG. 3 is changed. The button display 52 is used to perform a temperature synchronization setting in the driver's seat and the passenger seat. When a finger touches or approaches the button display 52, the synchronization setting or cancel of the synchronization setting is performed.

Since the minimum number of button displays 51 and 52 are separately disposed on the operation plane 22, a driver may easily operate the button displays 51 and 52 without mistake even when the driver does not look at the button displays 51 and 52. Furthermore, when a finger of the driver touches a region of the button display 51 or the button display 52, the feedback element 25 is driven under control of the controller 40, and when a feedback force is applied to the finger from the panel included in the operation plane 22, the driver may more easily recognize that an appropriate operation has been performed. Furthermore, when a change operation is performed because a finger of the driver approaching the button display 51 or the button display 52 within a predetermined distance is detected, sound may be generated from the sound unit 26 as a feedback operation so that the driver may easily recognize that an appropriate operation has been performed.

Figure 4:
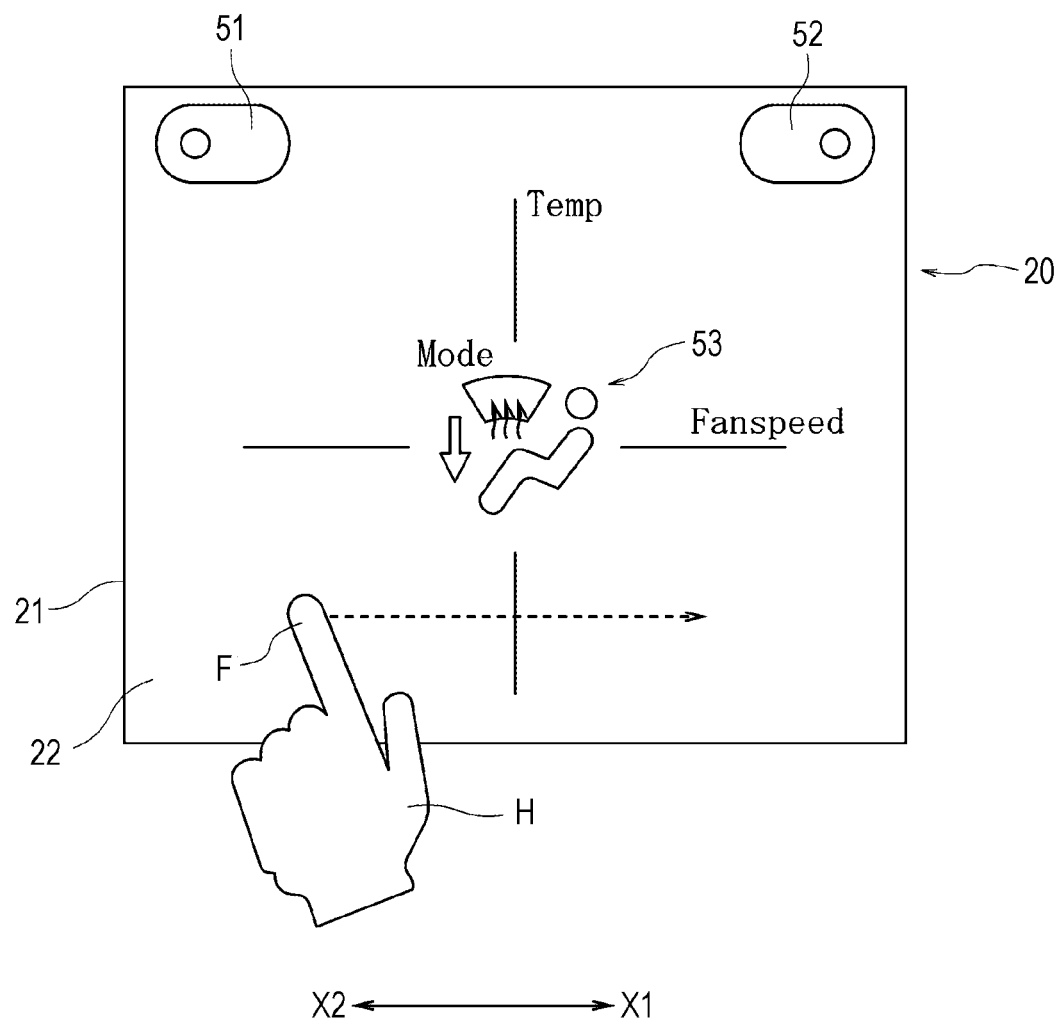
FIG. 4 is a diagram illustrating an operation in a first direction on the operation plane.

Most of the region of the operation plane 22 of the operation display unit 20 illustrated in FIG. 2 serves as a slide operation region except for the regions corresponding to the button displays 51 and 52. As illustrated in FIG. 4, if a finger F is linearly moved in the first direction (X1 to X2)

immediately after the finger F touching the operation plane 22 or approaching the operation plane 22 within the predetermined distance is detected in the slide operation region included in the operation plane 22, an operation of changing a fan speed, that is, an air volume, may be performed. As illustrated in FIG. 5, if the finger F is linearly moved in the second direction (Y1 to Y2) immediately after the finger F touching the operation plane 22 or approaching the operation plane 22 within the predetermined distance is detected in the slide operation region included in the operation plane 22, an operation of changing a temperature setting of the air conditioner may be performed. The operations illustrated in FIGS. 4 and 5 may be started anywhere in the slide operation region of the operation plane 22. When the finger F is moved, the controller 40 performs a change control by counting a relative movement distance. Furthermore, when the air volume is changed by an operation of the finger F, the air volume display image 34 of the information display screen 31 displayed in FIG. 3 is changed, and when the temperature setting is changed, the temperature display image 33 is changed.

Furthermore, the air volume or the temperature setting of the air conditioner may be changed by bringing a portion of a hand H other than the finger F (a palm, for example) into contact with the operation plane 22 or bringing the hand portion close to the operation plane 22 within the predetermined distance instead of the operation performed by the finger F. However, it is assumed that the air volume and the temperature setting are changed in accordance with a movement of the detected finger F in a description hereinafter.

In the operation display unit 20 of FIG. 2, when the operation plane 22 is pressed by the finger F or the hand H, the pressure sensor 24 is operated. When the controller 40 determines that the operation plane 22 has been pressed in accordance with an output of a detection performed by the pressure sensor 24, a position of the air outlet of the air conditioner is changed. Furthermore, when the operation plane 22 is pressed, the feedback element 25 is driven and a feedback force is applied to the finger F or the hand H from the panel included in the operation plane 22. As illustrated in FIGS. 2, 4, and 5, an air outlet changing image 53 indicating a change of the air outlet is displayed in a center portion of the operation plane 22. When the press of the operation plane 22 is detected by the pressure sensor 24, a position of the air outlet is changed, and a display mode of the air outlet changing image 53 displayed in the operation plane 22 is changed. Furthermore, display of the air outlet switching image 35 displayed in the information display screen 31 illustrated in FIG. 3 is also changed.

Figure 6:
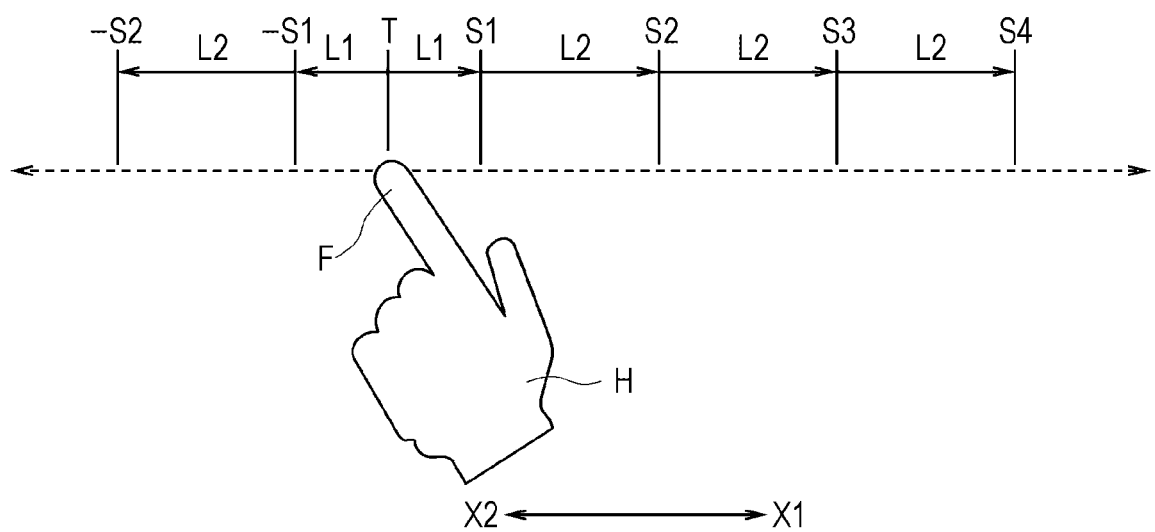
FIG. 6 is a diagram illustrating the relationship between an operation in the first direction and a change of the operation of a controlled device according to a first embodiment of the present invention.

FIG. 6 is a diagram illustrating the change operation of changing an air volume of the air conditioner by moving the finger F touching or approaching the operation plane 22 in the first direction (X1 to X2) according to the first embodiment.

In FIG. 6, a first position obtained when the electrostatic sensor 23 has detected the finger F which has touched or approached is indicated by T. The controller 40 determines that an operation is started when the finger F is detected. When the detected finger F is moved in a plus direction of the first direction (an X1 direction) from the detected position T, a fan speed of the air conditioner is gradually increased and an air volume is increased in accordance with a relative movement distance. On the other hand, when the detected finger F is moved in a minus direction of the first direction (an X2 direction) from the detected position T, the fan speed of the air conditioner is gradually reduced and the air volume is reduced in accordance with a relative movement distance.

In FIG. 6, when the finger F is moved in the X1 direction from the first detected position T, the controller 40 counts a movement distance of the finger F as the relative movement distance. When the counted distance reaches a first distance L1, it is determined that the finger F has reached a change boundary S1, and the controller 40 changes an operation of the controlled device 45 within a predetermined prescribed range. Specifically, the change is performed so that the air volume of the air conditioner is increased in a certain range. The air volume may be changed in a continuous manner or in stages while the finger F is moved by the first distance L1 from the detected position T. Alternatively, the air volume may be increased only by one stage by changing the fan speed only by one stage. However, an increase range of the air volume while the finger F is moved in the first distance L1 is determined in advance.

In FIG. 6, when the finger F is moved by a distance larger than the first distance L1 in the X1 direction, a movement distance from the change boundary S1 is further counted as the relative movement distance. When a movement distance of the finger F from the change boundary S1 reaches a second distance L2 which is longer than the first distance L1, it is determined that the finger F has reached the change boundary S2. The air volume of the air conditioner is changed so as to be increased within a prescribed range while the finger F is moved by the second distance L2. The air volume may be changed in a continuous manner or in stages while the finger F is moved by the second distance L2 from the change boundary S1. Alternatively, the air volume may be increased only by one stage. However, an increase range of the air volume while the finger F is moved by the second distance L2 is the same as the increase range of the air volume while the finger F is moved by the first distance L1. Specifically, the controller 40 changes the operation of the controlled device 45 in the same prescribed range in a case where the finger F is moved by the first distance L1 and in a case where the finger F is moved by the second distance L2.

Thereafter, every time a movement distance of the finger F in the X direction reaches the second distance L2, it is successively determined that switch boundaries S3, S4, and so on have been reached. The air volume of the air conditioner is changed so as to be increased within a prescribed range which is a constant range every time the finger F is moved by the second distance L2. The second distances L2 are the same and are longer than the first distance L1. Then, the air volume of the air conditioner is changed so as to be increased within a range which is the same as the range obtained when the finger F is moved by the first distance L1.

In FIG. 6, even when the finger F is moved in the X2 direction from the first detected position T, the controller 40 counts a movement distance of the finger F as the relative movement distance. When the counted distance becomes equal to the first distance L1, it is determined that the finger F has reached the change boundary −S1. Specifically, the change is performed so that the air volume of the air conditioner is reduced in a prescribed range. Thereafter, when the movement distance of the finger F becomes equal to the second distance L2, it is determined that the change boundary −S2 has reached and the air volume of the air conditioner is changed to be reduced in the prescribed range. Also in this case, the second distance L2 is longer than the first distance L1, and a range of reduction of the air volume of the air conditioner while the finger F is moved by the first distance L1 is the same as that while the finger F is moved by the second distance L2.

In the operation illustrated in FIG. 6, since the air volume of the air conditioner is increased in a predetermined range only by moving the finger F which has been first detected from the detected position T by the first distance L1 which is a short distance, the air volume may be quickly changed by the finger F, and in addition, it may be recognized that an appropriate operation has been performed at an early stage immediately after the operation is started. In particular, when the finger F is moved by the first distance L1, the feedback force is applied to the finger F by the feedback element 25 or a feedback is given by sound generated by the sound unit 26, and in addition, the air volume display image 34 displayed in the information display screen 31 of FIG. 3 is changed in a predetermined range. In this way, the fact that an appropriate operation has been performed may be recognized at an early stage even when the driver performs the operation without viewing the display.

Furthermore, after the finger F is moved by the first distance L1, every time the finger F is moved by the second distance L2 which is longer than the first distance L1, the air volume of the air conditioner is changed in a range which is the same as that in the case of the movement by the first distance L1. In this case, a range of the change of the air volume relative to the movement distance of the finger F is small, and therefore, the air volume may be finely controlled by the finger F with ease. Also in this case, every time the finger F is moved by the second distance L2, the feedback element 25 or the sound unit 26 gives a feedback to the driver, that is, the operator, and the driver may recognize an operation state by a change of the air volume display image 34 of the information display screen 31 of FIG. 3.

Next, as illustrated in FIG. 5, when the finger F touching or approaching the operation plane 22 is moved in a plus direction of the second direction (the Y1 direction), a temperature setting of the air conditioner is increased in a continuous manner or in stages. On the other hand, when the finger is moved in a minus direction of the second direction (the Y2 direction), the temperature setting of the air conditioner is reduced in a continuous manner or in stages. In these cases, every time the finger F is moved by the same distance, the temperature setting is changed by the same range. However, as illustrated in FIG. 7, as with the change of the air volume illustrated in FIG. 6, even in the operation of changing the temperature setting of the air conditioner, a setting for changing the temperature setting in the same prescribed range by the movements by the first distance L1 and the second distance L2 which are different from each other may be performed.

Figure 7:
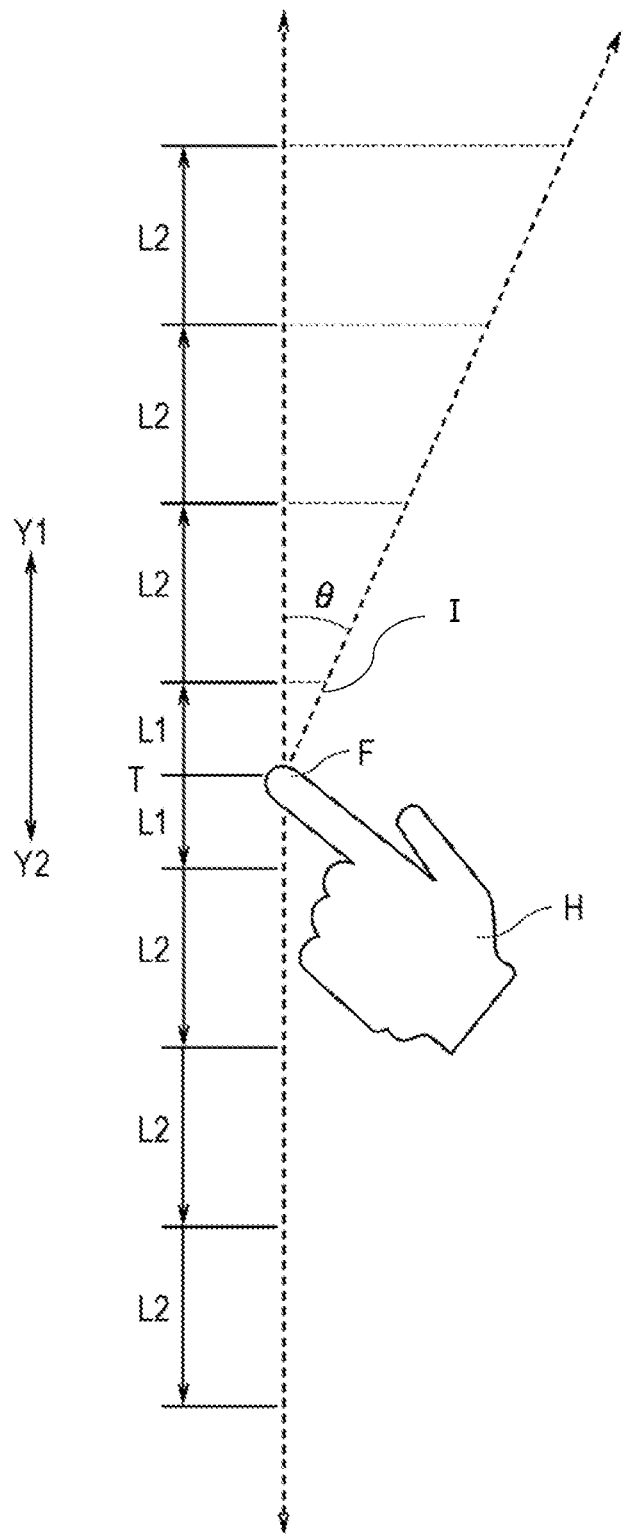
FIG. 7 is a diagram illustrating the relationship between an operation in the second direction and a change of the operation of the controlled device according to a first embodiment of the present invention.

In the example illustrated in FIG. 7, the temperature setting of the air conditioner is increased in a continuous manner or in stages in a predetermined range (a prescribed range, such as 2° C. or 5° C.) only by moving the finger F from the detected position T where the finger F has been first detected by the electrostatic sensor 23 in the Y1 direction by the first distance L1. Thereafter, every time the finger is moved by the second distance L2 which is longer than the first distance L1, the temperature setting of the air conditioner is increased in a continuous manner or in stages in the same range (the prescribed range, such as 2° C. or 5° C.) as the case of the movement by the first distance L1. When the finger F is moved from the detected position T in the Y2 direction, the temperature setting of the air conditioner is reduced in a continuous manner or in stages in a predetermined range (a prescribed range, such as 2° C. or 5° C.) by the movement by the first distance L1, and thereafter, every time the finger F is moved by the second distance L2 which is longer than the first distance L1, the temperature setting is reduced in the same range.

In the operation of FIG. 7, the temperature setting of the air conditioner may be finely changed only by moving the finger F from the detected position T by a short distance, and a fact that an appropriate operation has been performed may be recognized at an early stage. Furthermore, when the finger F is moved by the first distance L1, a feedback is given to the driver and the temperature display image 33 of the information display screen 31 illustrated in FIG. 3 is changed. In this way, the driver may quickly recognize that an appropriate operation has been performed even when the driver performs an operation without looking the display. After the movement by the first distance L1, the temperature setting may be changed in the same range as the case of the movement by the first distance L1 by moving the finger F by the second distance L2 which is longer than the first distance L1, and therefore, the temperature may be finely controlled.

In the examples illustrated in FIGS. 6 and 7, an operation of the controlled device 45 is changed in the prescribed range when the finger F is moved from the detected position T by the first distance L1, and thereafter, the operation of the controlled device 45 is changed in the same prescribed range as the case of the movement by the first distance L1 every time the finger F is moved by the second distance L2. Note that, as illustrated in a modification in FIG. 8, the operation of the controlled device 45 may be changed in the same prescribed range as the case of the movement by the first distance L1 every time a movement distance is increased in stages from the second distance L2, a third distance L3, to a fourth distance L4, for example, after the finger F is moved by the first distance L1. Specifically, the following relationship is obtained: (first distance L1)<(second distance L2)< (third distance L3)<(fourth distance L4), and so on. In this way, every time the finger F is moved by the individual distances, the operation of the controlled device 45 may be changed in the same range.

Next, in a case where a movement locus I of the finger F is inclined relative to the direction of Y1 to Y2 as illustrated in FIG. 7, if an angle θ of the inclination is within a predetermined range (for example, within 45 degrees), the operation of the controlled device 45 may be changed in the same range every time it is determined that a component of the direction of Y1 to Y2 of a movement distance along the movement locus I corresponds to the first distance L1 or the second distance L2. This is true of a case where the finger F is moved in a locus having an angle relative to the direction of X1 to X2.

Figure 9:
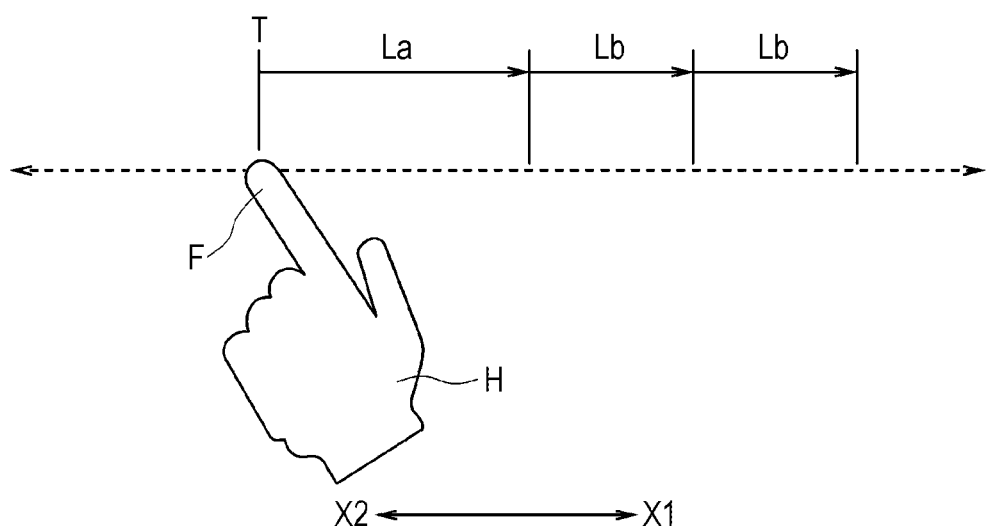
FIG. 9 is a diagram illustrating the relationship between an operation in a first direction and a change of an operation of a controlled device according to a second embodiment of the present invention.

FIG. 9 is a diagram illustrating an operation method according to a second embodiment.

In the second embodiment, when a finger F is moved by a first distance La from a detected position T where an electrostatic sensor 23 has first detected the finger F in a plus direction of a first direction (an X1 direction), an air volume of an air conditioner is increased within a predetermined prescribed range in a continuous manner or in stages. Thereafter, every time the finger F is moved by a constant second distance Lb which is shorter than the first distance La, the air volume of the air conditioner is increased in the same prescribed range as a case where the finger F is moved by the first distance La, and this process is repeatedly performed. This is true of a case where the finger F is moved in a minus direction (an X2 direction) from the detected position T. The air volume of the air conditioner is reduced within a predetermined range every time the finger F is moved by the first distance La, and thereafter, the air volume of the air conditioner is reduced in the same range as a case where the finger F is moved by the first distance La every time the finger F is moved by the second distance Lb in the X2 direction. Furthermore, the same operation may be performed also in a case where the temperature setting of the air conditioner is changed by moving the finger F in the direction of Y1 to Y2.

In the second embodiment illustrated in FIG. 9, an operation of a controlled device 45 is changed within a predetermined range by moving the finger F which has been detected on an operation plane 22 from the detected position T by a long distance. Accordingly, the operation of the controlled device 45 is prevented from being changed in stages due to an undesired movement of the finger F immediately after start of the operation. In an in-vehicle operation apparatus 10, the finger F or a hand H which is to perform an operation may be undesirably moved in a large degree due to vehicle body vibration. However, according to the second embodiment, an initial change of the controlled device 45 may be appropriately performed even if the finger F is moved in a large degree due to the vehicle body vibration immediately after start of the operation. Furthermore, after the movement by the first distance La, the operation of the controlled device 45 may be changed even if a movement distance of the finger F is short, and accordingly, a change operation performed after the finger F is moved by the first distance may be quickly performed.

Figure 10:
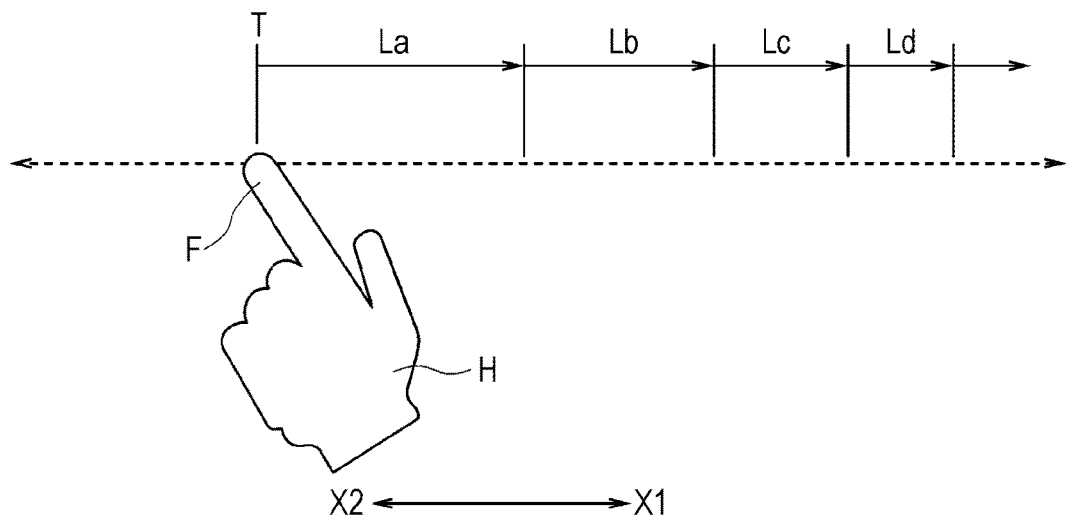
FIG. 10 is a diagram illustrating the relationship between an operation in a first direction and a change of an operation of a controlled device according to a modification of the second embodiment of the present invention.

FIG. 10 is a modification of the second embodiment illustrated in FIG. 9. In the modification illustrated in FIG. 10, an operation of a controlled device 45 is changed in a predetermined range when a finger F is first moved from a detected position T by a first distance La, and thereafter, the operation of the controlled device 45 is changed in the same range as the case of the movement by the first distance La every time a movement distance is reduced in stages from a second distance Lb, a third distance Lc, to a fourth distance Ld, for example. Specifically, the following relationship is obtained: (first distance La)>(second distance Lb)>(third distance Lc)>(fourth distance L4), and so on. In this way, every time the finger F is moved by the individual distances, the operation of the controlled device 45 may be changed in the same range.

Figure 8:
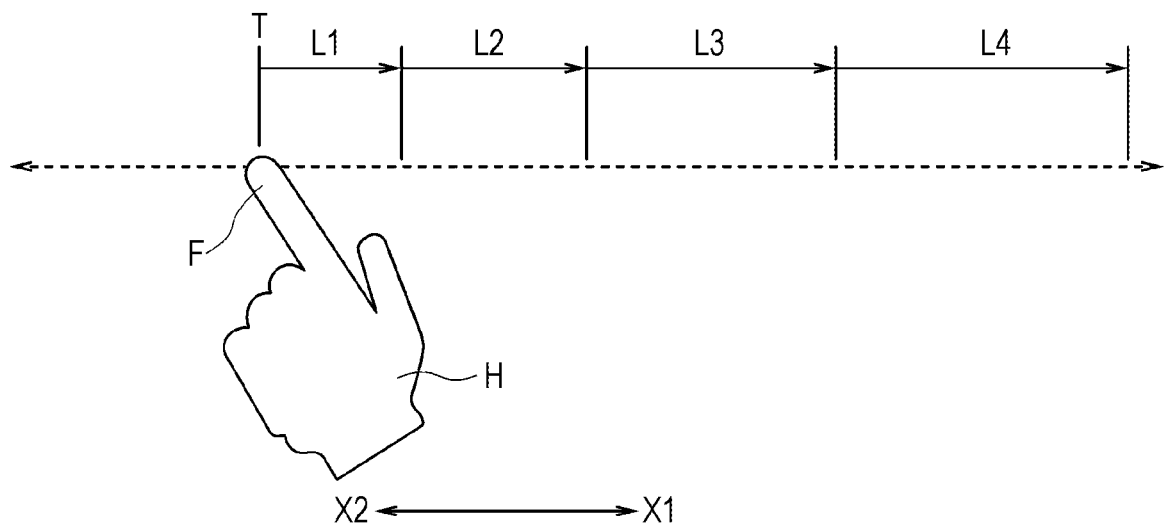
FIG. 8 is a diagram illustrating the relationship between an operation in a first direction and a change of an operation of a controlled device according to a modification.

The first distance L1 is set using the detected position T where the finger F has been detected as a start point in the first embodiment illustrated in FIGS. 6 to 8, and the first distance La also is set using the detected position T as a start point in the second embodiment illustrated in FIGS. 9 and 10. However, the first distance L1 or the first distance La may be set after the detected finger F is moved from the detected position T for a predetermined period of time or by a predetermined distance. For example, the first distance L1 or the first distance La may be set after the finger F is moved from the detected position T and recognition of the movement is started by the controller 40. Alternatively, the first distance L1 or the first distance La may be set after the finger F is moved from the detected position T and performs a certain operation.

Figure 11:
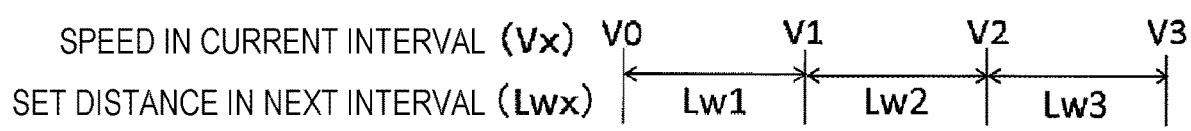
FIG. 11 is a diagram illustrating the relationship between a scanning speed (or an acceleration rate) of a finger in a first direction and a subsequent setting of a distance according to a third embodiment of the present invention.
Figure 12:
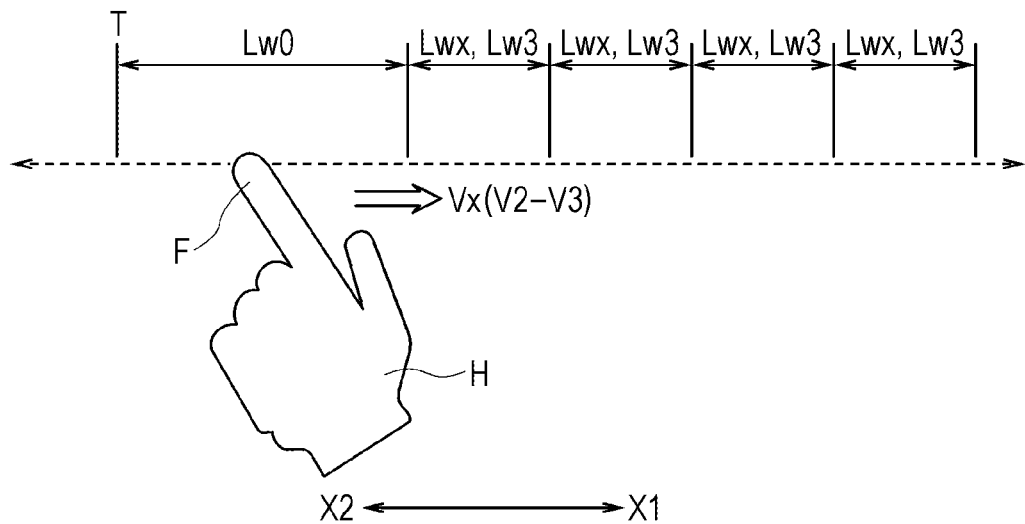
FIG. 12 is a diagram illustrating the relationship between an operation in a first direction and a change of an operation of a controlled device according to the third embodiment of the present invention.

FIGS. 11 and 12 are diagrams illustrating an operation method according to a third embodiment of the present invention.

In the operation method illustrated in FIG. 12, a first distance Lw0 is determined in advance using a detected position T as a start point. When a finger F detected in the detected positon T is moved by the first distance Lw0, an operation of a controlled device 45 is changed in a prescribed range. For example, an air volume of an air conditioner is changed within a predetermined range, or a temperature setting is changed within a predetermined range. Thereafter, an operation of the controlled device 45 is changed in the same prescribed range when the finger F is moved by a distance Lwx which is different from the first distance Lw0. The prescribed range of the change of the operation of the controlled device 45 when the finger F is moved by the first distance Lw0 is equivalent to a range of a change of the operation of the controlled device 45 when the finger F is moved by the distance Lwx. However, in this operation method, while the finger F is moved by the first distance Lw0, the controller 40 measures a speed or an acceleration rate of the finger F based on a detection output from an electrostatic sensor 23 and sets the distance Lw0 to be used in accordance with a measured value. Here, examples of the speed and the acceleration rate include an average value of speeds or acceleration rates obtained when the finger F is moved by the first distance Lw0 or a maximum value of the speeds or the acceleration rates.

Also in this case, at a time when a movement distance of the finger F reaches the first distance Lw1 and after this time, a feedback operation is performed every time the distance Lwx is reached and the feedback element 25 or the sound unit 26 is operated. Furthermore, a state of a change of an operation range of the controlled device 45 is displayed in an information display screen 31.

FIG. 11 is a diagram illustrating the relationship between a measured speed Vx of the finger F and the movement distance Lwx of the finger F set in a next interval. Although the speed Vx is illustrated in FIG. 11, the same is true of a case where an acceleration rate is used. The controller 40 stores reference values V0 to V3 of the speed Vx as threshold values. The following relationship is obtained: V0<V1<V2<V3. The reference value V0 indicates a speed of zero or an extremely low speed obtained at a time of a movement starting at the speed of zero. When the speed Vx obtained while the finger F is moved by the first distance Lw0 is a value in a range from V0 to V1, the distance Lwx which is to be set next is Lw1. When the speed Vx is a value in a range from V1 to V2, the distance Lwx is Lw2, and when the speed Vx is a value in a range from V2 to V3, the distance Lwx is Lw3. The following relationship is obtained: Lw1>Lw2>Lw3. The speed Vx and the distance Lwx may be set in a larger number of stages.

In an example of FIG. 12, the speed Vx of the finger F which is moved by the first distance Lw0 is a high speed value in a range from V2 to V3, and therefore, the distance Lwx subsequently set is as short as Lw3. In FIG. 12, the finger F is moved at a high speed (a high acceleration rate) by the first distance Lw0, and therefore, the controller 40 sets a short distance Lw3 as the subsequent distance Lwx because the controller 40 estimates that an operator desires to quickly change an operation of the controlled device 45. In this case, after the finger F passes the first distance Lw0, the operation of the controlled device 45 may be quickly changed in a wide range by only moving the finger F a smaller distance.

Figure 13:
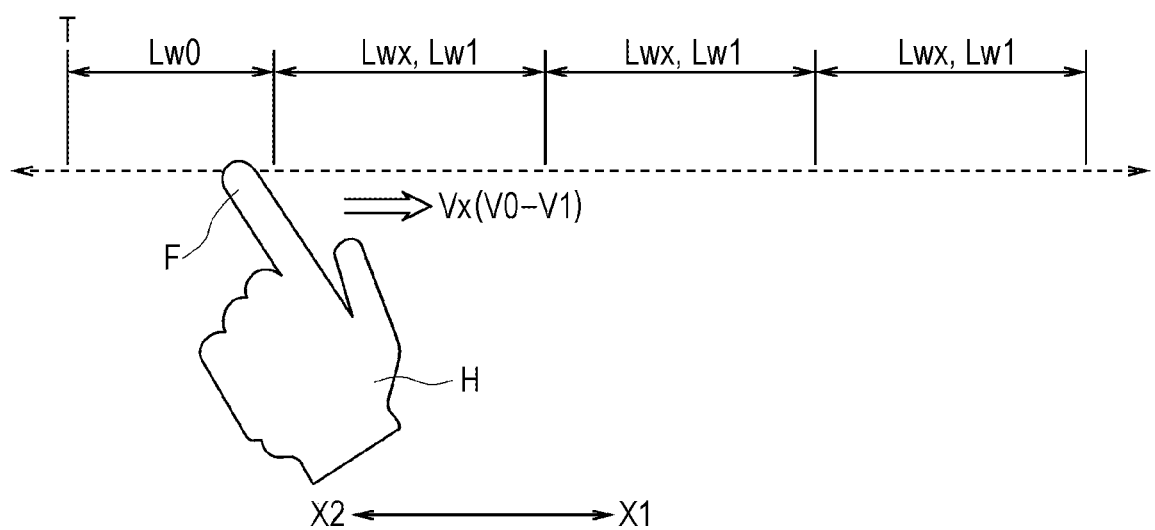
FIG. 13 is a diagram illustrating the relationship between an operation in a first direction and a change of an operation of a controlled device according to a modification of the third embodiment of the present invention.

In an example of FIG. 13, the speed Vx of the finger F which is moved by the first distance Lw0 is a low speed value in a range from V0 to V1, and therefore, the distance Lwx subsequently set is as long as Lw1. In FIG. 13, the finger F is moved at a low speed (a low acceleration rate) in the first distance Lw0, and therefore, the controller 40 sets a long distance Lw1 as the subsequent distance Lwx because the controller 40 estimates that an operator desires to finely change an operation of the controlled device 45. In this case, after the finger passes the first distance Lw0, the operation of the controlled device 45 is finely controlled with ease by a movement of the finger F.

Although the first distance Lw0 is set using the detected position T as a start point in FIGS. 12 and 13, as with the first and second embodiments, the first distance may be set after the finger F is moved from the detected position T by a certain distance in the third embodiment.

Figure 14:
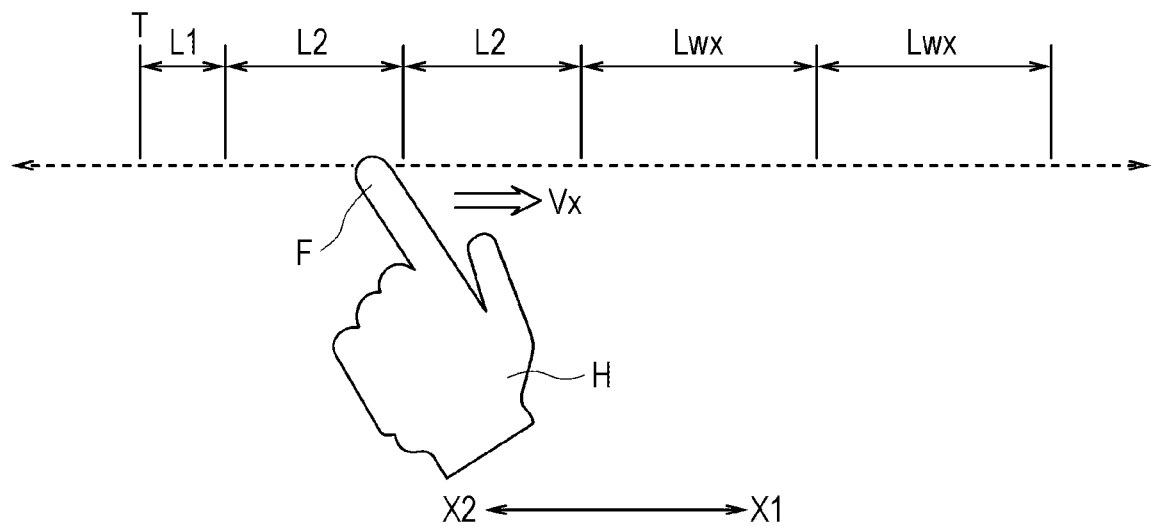
FIG. 14 is a diagram illustrating the relationship between an operation in the first direction and a change of an operation of the controlled device according to the third embodiment of the present invention.

In a modification of the third embodiment illustrated in FIG. 14, as with the first embodiment illustrated in FIG. 6, a first distance L1 is set using a detected position T as a reference, and thereafter, a predetermined second distance L2 which is longer than the first distance L1 is set in a subsequent interval or in a plurality of subsequent intervals. Subsequently, a speed (or an acceleration rate) is obtained while a finger F is moved by the distance L1 or the distance L2 and a subsequent distance Lwx is set in accordance with the measured speed (or the measured acceleration rate) after the movement by the distance L2. Specifically, the distance L1 or the distance L2 is set as a new first distance, and the subsequent distance Lwx is set in accordance with the speed (or the acceleration rate) of the finger F which is moved by the first distance. Also in this case, a range of a change of an operation of a controlled device 45 is the same prescribed range among a period of time when the finger F is moved by the distance L1, a period of time when the finger F is moved by the distance L2, and a period of time when the finger F is moved by the distance Lwx.

Figure 15:
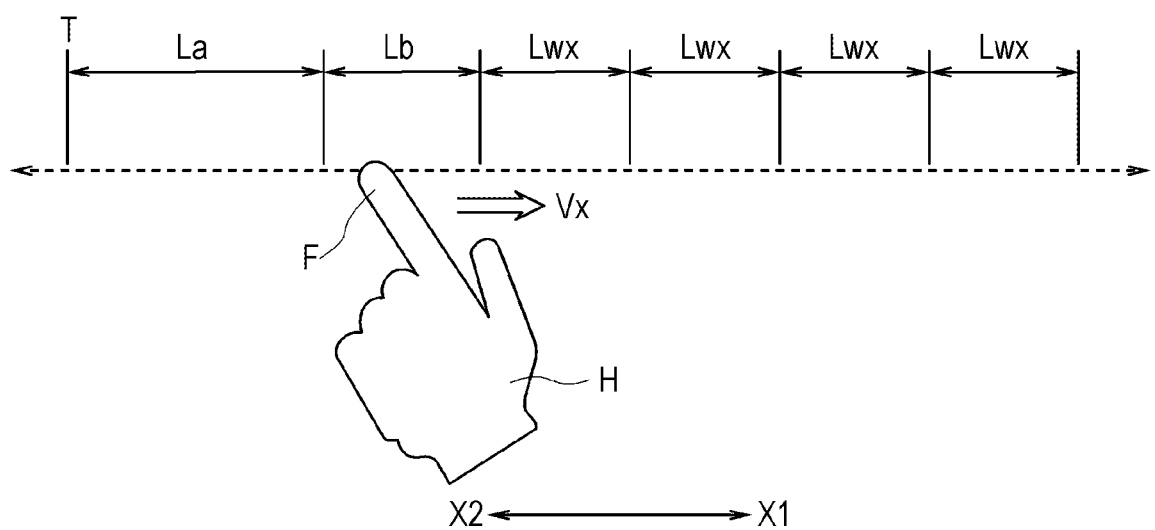
FIG. 15 is a diagram illustrating the relationship between an operation in a first direction and a change of an operation of a controlled device according to a modification of the third embodiment of the present invention.

In a modification of the third embodiment illustrated in FIG. 15, as with the second embodiment illustrated in FIG. 9, a first distance La is set using a detected position T as a start point, and thereafter, a second distance Lb which is shorter than the first distance La is set. Specifically, the distance La or the distance Lb is set as a new first distance, and the subsequent distance Lwx is set in accordance with the speed (or the acceleration rate) of the finger F which is moved by the distance La or the distance Lb. Also in this case, a range of a change of an operation of a controlled device 45 is the same prescribed range among a period of time when the finger F is moved by the distance La, a period of time when the finger F is moved by the distance Lb, and a period of time when the finger F is moved by the distance Lwx.

Figure 16:
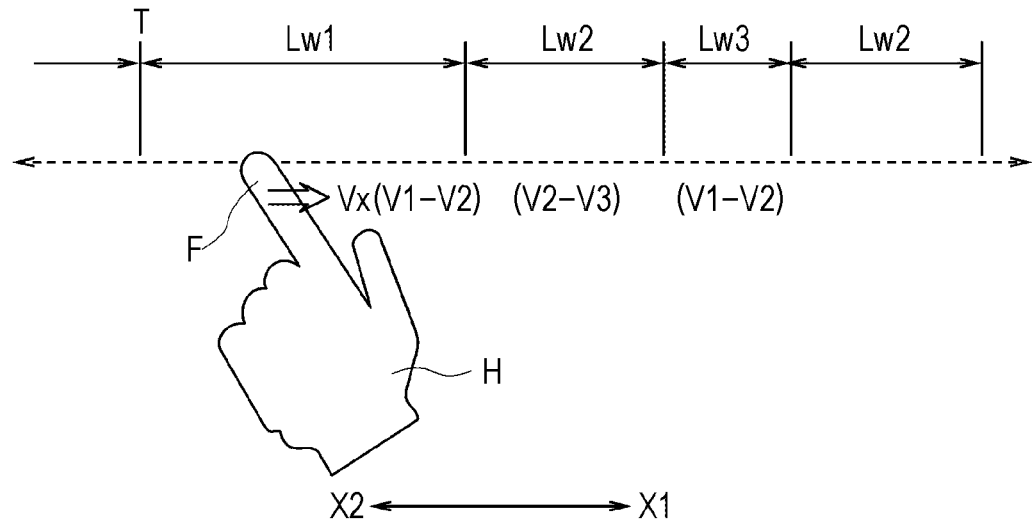
FIG. 16 is a diagram illustrating the relationship between an operation in a first direction and a change of an operation of a controlled device according to a modification of the third embodiment of the present invention.

FIG. 16 is a diagram illustrating a further modification of the third embodiment of the present invention.

In this modification, an interval of one of the distances obtained after a detected position T where an electrostatic sensor 23 has detected a finger F is determined as a new first distance, a speed (or an acceleration rate) of the finger F which is moved by the new first distance is measured, and a subsequent distance is set in accordance with the measured value. In the example of FIG. 16, when the finger F is moved by the distance Lw1, the distance Lw1 is determined as a new first distance and a speed (an acceleration rate) of the finger F is measured. After it is determined that the speed is in a range from V1 to V2, a distance Lw2 is set. Thereafter, the distance Lw2 is determined as a new first distance, and a speed of the finger F which is moved by the new first distance Lw2 is measured. After it is determined that the speed is in a range from V2 to V3, a distance Lw3 is set. Furthermore, after it is determined that the speed of the finger which is moved by the distance Lw3 is in the range from V1 to V2, the distance Lw2 is set. A range of a change of an operation of a controlled device 45 is the same prescribed range among periods of time when the finger F is moved by the individual distances.

In the modification illustrated in FIG. 16, when the finger F in a detection state is moved, a subsequent distance is changed in accordance with a change of a movement speed (or an acceleration rate) so that an operation in which an operator's will is reflected may be constantly performed. Note that distances in subsequent intervals are changed in turn for individual intervals in accordance with a speed (or an acceleration rate) of the finger F which is moved in a certain one of the distance intervals in FIG. 16. However, once the distance Lw1 is set, for example, a distance may not be changed and may be repeated for a predetermined period of time or a predetermined number of intervals, and thereafter, a new distance may be set in accordance with a measured speed (or a measured acceleration rate) and the new distance may be repeated for a predetermined period of time or a predetermined number of intervals.

As illustrated in FIG. 1, an information display screen 31 of an information display unit 30 is positioned in front of a driver's seat so that a driver may more easily view the information display screen 31 as compared with an operation plane 22. An automatic mode switching image 32, a temperature display image 33, an air volume display image 34, and an air outlet switching image 35 are displayed in the information display screen 31. Furthermore, information on a change associated with a synchronization change in temperature in the driver's seat and a passenger seat is also displayed. By changing the display image in the information display screen 31 which is easily viewed in association with an operation performed on the operation plane 22, the driver may easily operate the operation plane 22 without viewing the operation plane 22.

Next, a series of control operations performed by the controller 40 will be described with reference to a flowchart in FIG. 18.

Figure 18:
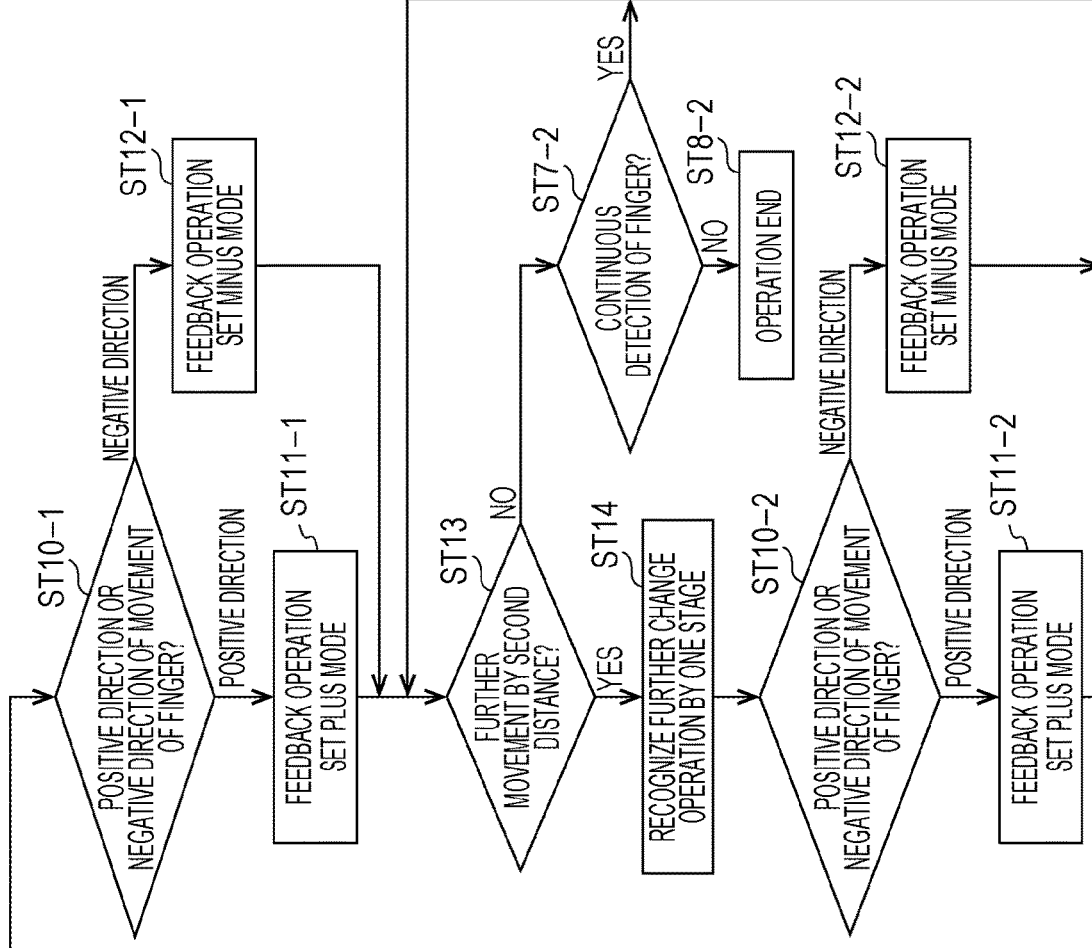
FIG. 18 is a flowchart of a control operation of changing an operation of a controlled device by operating an operation plane.
Figure 18:
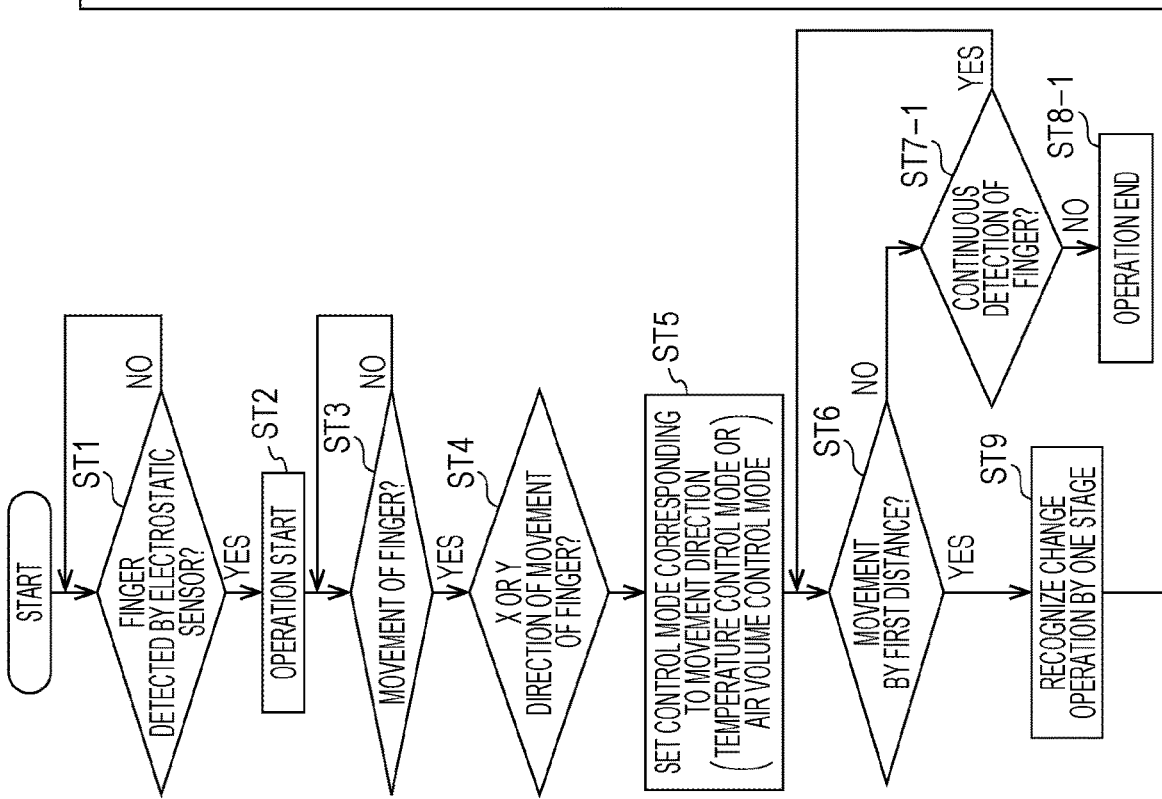

FIG. 18 is a flowchart of a control operation according to the first embodiment illustrated in FIGS. 6 and 7 or the second embodiment illustrated in FIG. 9. Specifically, a control operation of FIG. 18 is performed in the following case. In both of a case where the finger F is moved in the first direction (the direction of X1 to X2) along the operation plane 22 and a case where the finger F is moved in the second direction (the direction of Y1 to Y2) along the operation plane 22, an operation of the controlled device 45 is changed in a predetermined range while the finger F is moved by the first distance (L1 or La), and thereafter, every time the finger F is moved by the second distance (L2 or Lb) which is longer or shorter than the first distance, the operation of the controlled device 45 is changed in the same range. In the flowchart, individual control steps are denoted by "ST". A control flow of the third embodiment illustrated in FIGS. 11 to 16 is also basically the same as that of FIG. 18. In the third embodiment, only a process of determining a next distance (a second distance in FIG. 18) in accordance with a measured speed or a measured acceleration rate is added to the flowchart of FIG. 18.

In ST1 of FIG. 18, the electrostatic sensor 23 determines whether the finger F has been detected. The finger F is detected when the finger F has touched the operation plane 22 or approached the operation plane 22 within a predetermined distance. When the finger F is detected, the controller 40 recognizes that an operation has been started in ST2.

In ST3, it is determined whether the detected finger F has been moved. Although a movement of the finger F is awaited in ST3, if the finger F is not moved for a predetermined period of time or if the finger F is not moved, and therefore, movement is not detected, the operation is terminated. When it is determined that the finger F in a detected state has been moved in ST3, the process proceeds to ST4 where it is determined whether a movement direction of the finger F is the first direction (the X direction) or the second direction (the Y direction). In ST5, when it is determined that the movement direction of the finger F is the first direction (the X direction) illustrated in FIGS. 4 and 6, an air volume control mode is set as a control mode for the air conditioner which is the controlled device 45. When it is determined that the movement direction of the finger F is the second direction (the Y direction) illustrated in FIGS. 5 and 7, a temperature control mode is set as the control mode for the air conditioner.

In ST6, it is determined whether the finger F in the detected state has been moved by the first distance (L1 or La). In ST7-1, it is determined whether the detection of the finger F is continuously performed until the movement distance of the finger F reaches the first distance. When the finger F enters an undetected state, the process proceeds to ST8-1 where the operation is terminated. When it is determined that the movement distance of the finger F has reached the first distance, the process proceeds to ST9 where the controller 40 recognizes a change operation state in a first stage.

In ST10-1, it is determined whether a movement direction of the finger F which has been moved by the first distance is a positive direction or a negative direction. When it is determined that the movement direction of the finger F is the positive direction in ST10-1, the process proceeds to ST11-1 and an operation in a plus mode is executed. When the air volume control mode has been set in ST5, an air volume of the air conditioner is increased within a prescribed range in accordance with the movement of the finger F in the X1 direction whereas when the temperature control mode has been set in ST5, a setting temperature is increased within a prescribed range in accordance with the movement of the finger F in the Y1 direction. In ST11-1, a feedback operation is simultaneously performed, at least one of the feedback element 25 and the sound unit 26 is operated, and a notification indicating that the operation change has been completed is transmitted to the operator.

When it is determined that the movement direction of the finger F is the negative direction in ST10-1, the process proceeds to ST12-1 and an operation in a minus mode is executed. When the air volume control mode has been set in ST5, an air volume of the air conditioner is reduced within a prescribed range in accordance with the movement of the finger F in the X2 direction whereas when the temperature control mode has been set in ST5, a setting temperature is reduced within a prescribed range in accordance with the movement of the finger F in the Y2 direction. Also in ST12-1, the feedback operation is simultaneously performed, at least one of the feedback element 25 and the sound unit 26 is operated, and a notification indicating that the operation change has been completed is transmitted to the operator.

Thereafter, the process proceeds to ST13 where it is determined whether the finger F in the detected state has been moved by the second distance (L2 or Lb). It is determined whether the detected state of the finger F has been continued in ST7-2 for the movement by the second distance, and when the finger F is no longer detected, the process proceeds to ST8-2 where the operation is terminated. When it is determined that the finger F has been moved by the second distance in ST13, the process proceeds to ST14 where the controller 40 recognizes a change operation state in a next stage.

In ST10-2, it is determined whether a movement direction of the finger F which has been moved by the second distance is a positive direction or a negative direction. When it is determined that the finger F has been moved in the positive direction, the process proceeds to ST11-2 where the operation in the plus mode which is the same as ST11-1 is executed and the feedback operation is performed. When it is determined that the finger F has been moved in the negative direction, the process proceeds to ST12-2 where the operation in the minus mode which is the same as ST12-1 is executed and the feedback operation is performed.

Note that, even in a case where the controlled device 45 is a sound apparatus, a car navigation apparatus, or a control device associated with a driving function of a vehicle, an operation of any of the various types of controlled device 45 is changed within a predetermined range by performing an operation illustrated in FIGS. 6 to 16 by a finger or a hand detected on the operation plane 22.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An operation apparatus comprising:
an operation plane;
a sensor configured to detect a finger or a hand touching or approaching the operation plane and further detect a movement of the finger or the hand touching or approaching the operation plane; and
a controller configured to control a controlled device based on a detection output of the sensor,
wherein the controller determines start of an operation when the sensor detects a finger or a hand touching or approaching the operation plane, changes the operation of the controlled device in a prescribed range when it is determined that the finger or the hand detected by the sensor has been moved by a first distance along the operation plane at a time point after the determination of the start of the operation, and changes the operation of the controlled device in a range equivalent to the prescribed range when it is determined that the finger or the hand moved by the first distance has been moved by a distance which is different from the first distance along the operation plane.

2. The operation apparatus according to claim 1, wherein the controller successively changes the operation of the controlled device in a range equivalent to the prescribed range every time it is determined that the finger or the hand moved by the first distance has been moved by a second distance which is longer than the first distance along the operation plane.

3. The operation apparatus according to claim 1, wherein the controller successively changes the operation of the controlled device in a range equivalent to the prescribed range every time it is determined that the finger or the hand moved by the first distance has been moved by a distance which is longer than the first distance and which is increased in stages along the operation plane.

4. The operation apparatus according to claim 1, wherein the controller successively changes the operation of the controlled device in a range equivalent to the prescribed range every time it is determined that the finger or the hand moved by the first distance has been moved by a second distance which is shorter than the first distance along the operation plane.

5. The operation apparatus according to claim 1, wherein the controller successively changes the operation of the controlled device in a range equivalent to the prescribed range every time it is determined that the finger or the hand moved by the first distance has been moved by a distance which is shorter than the first distance and which is reduced in stages along the operation plane.

6. The operation apparatus according to claim 1, wherein the controller measures a speed or an acceleration rate while the finger or the hand is moved by the first distance along the operation plane based on the detection output of the sensor and sets a movement distance of the finger or the hand required for a change of the operation of the controlled device in a range equivalent to the prescribed range in accordance with the measured speed or the measured acceleration rate.

7. The operation apparatus according to claim 6, wherein the controller sets a longer movement distance of the finger or the hand required for a change of the operation of the controlled device in a range equivalent to the prescribed range when the measured speed or the measured acceleration rate is smaller than a reference value and sets a shorter movement distance of the finger or the hand required for a change of the operation of the controlled device in a range equivalent to the prescribed range when the measured speed or the measured acceleration rate is larger than the reference value.

8. The operation apparatus according to claim 1, wherein the first distance is set using a position of the finger or the hand obtained when the start of the operation is determined as a start point.

9. The operation apparatus according to claim 1, wherein the first distance is set using a position of the finger or the hand which has been moved by a predetermined distance after the start of the operation is determined as a start point.

10. The operation apparatus according to claim 1, wherein the controller changes the operation of the controlled device in one of different control modes in accordance with a movement direction of the finger or the hand when it is determined that the finger or the hand has been moved in one of different directions which are orthogonal to each other along the operation plane.

11. The operation apparatus according to claim 1, wherein the controller performs a feedback operation by force or sound when it is determined that the finger or the hand has been moved by the first distance and further performs a feedback operation by force or sound every time it is determined that the finger or the hand has been moved by a distance required for a change of the operation of the controlled device in a range equivalent to the prescribed range.

12. An operation control method for an operation apparatus including an operation plane, a sensor configured to detect a finger or a hand touching or approaching the operation plane and further detect a movement of the finger or the hand touching or approaching the operation plane, and a controller configured to control a controlled device based on a detection output of the sensor, the operation control method comprising:

a first step of determining start of an operation when the sensor detects a finger or a hand touching or approaching the operation plane;

a second step of changing the operation of the controlled device in a prescribed range when it is determined that the finger or the hand detected by the sensor has been moved by a first distance along the operation plane at a time point after the determination of the start of the operation; and a third step of changing the operation of the controlled device in a range equivalent to the prescribed range when it is determined that the finger or the hand moved by the first distance has been moved by a distance which is different from the first distance along the operation plane.

13. The operation control method according to claim 12, wherein the operation of the controlled device is successively changed in a range equivalent to the prescribed range every time it is determined that the finger or the hand moved by the first distance has been moved by a second distance which is longer than the first distance along the operation plane in the third step.

14. The operation control method according to claim 12, wherein the operation of the controlled device is successively changed in a range equivalent to the prescribed range every time it is determined that the finger or the hand moved by the first distance has been moved by a distance which is longer than the first distance and which is increased in stages along the operation plane in the third step.

15. The operation control method according to claim 12, wherein the operation of the controlled device is successively changed in a range equivalent to the prescribed range every time it is determined that the finger or the hand moved by the first distance has been moved by a second distance which is shorter than the first distance along the operation plane in the third step.

16. The operation control method according to claim 12, wherein the operation of the controlled device is successively changed in a range equivalent to the prescribed range every time it is determined that the finger or the hand moved by the first distance has been moved by a distance which is shorter than the first distance and which is reduced in stages along the operation plane in the third step.

17. The operation control method according to claim 12, wherein a speed or an acceleration rate is measured while the finger or the hand is moved by the first distance along the operation plane based on a detection output of the sensor in the second step, and wherein a movement distance of the finger or the hand required for a change of the operation of the controlled device within a range equivalent to the prescribed range in the third step is set in accordance with the measured speed or the measured acceleration rate in the third step.

18. The operation control method according to claim 17, wherein a longer movement distance of the finger or the hand required for a change of the operation of the controlled device in a range equivalent to the prescribed range is set in the third step when the measured speed or the measured acceleration rate is smaller than a reference value in the second step and a shorter movement distance of the finger or the hand required for a change of the operation of the controlled device in a range equivalent to the prescribed range is set in the third step when the measured speed or the measured acceleration rate is larger than the reference value in the second step.

19. The operation control method according to claim 12, wherein the operation of the controlled device is changed in one of different control modes in accordance with a movement direction of the finger or the hand when it is determined that the finger or the hand has been moved in one of different directions which are orthogonal to each other along the operation plane in the second and third steps.

* * * * *